United States Patent [19]

Moore et al.

[11] Patent Number: 5,414,942
[45] Date of Patent: May 16, 1995

[54] APPARATUS AND METHOD FOR MEASURING BALUSTER LENGTHS AND REPLICATING BALUSTER LAYOUT FROM A BASE SURFACE TO A HANDRAIL

[75] Inventors: Daniel Moore, New Philadelphia, Ohio; Brian Challis, Sandy, Utah

[73] Assignee: L. J. Smith, Inc., Bowerston, Ohio

[21] Appl. No.: 196,703

[22] Filed: Feb. 14, 1994

[51] Int. Cl.6 ............................................. B25H 7/04
[52] U.S. Cl. ........................................ 33/666; 33/809; 33/332
[58] Field of Search ............... 33/332, 282, 283, 284, 33/354, 451, 809, 806, 516, 644, 645, 666, 669, 679, 578, 579

[56] References Cited

U.S. PATENT DOCUMENTS

| | | | |
|---|---|---|---|
| 160,471 | 3/1875 | Robinson | 33/666 |
| 491,840 | 2/1893 | Field | 33/332 |
| 1,583,585 | 5/1926 | Emery | 33/809 |
| 2,245,646 | 6/1941 | Bullivant | 33/354 |
| 2,864,770 | 8/1958 | Williams | 33/809 |
| 3,075,294 | 1/1963 | Strecker | 33/644 |
| 3,407,509 | 10/1968 | Martinez | 33/666 |
| 4,328,619 | 5/1982 | Lefevre et al. | 33/809 |
| 4,532,718 | 8/1985 | Copeland | 33/578 |

FOREIGN PATENT DOCUMENTS

| | | | |
|---|---|---|---|
| 0520842 | 5/1957 | Japan | 33/809 |
| 0046103 | 3/1980 | Japan | 33/809 |

*Primary Examiner*—Thomas B. Will
*Attorney, Agent, or Firm*—Thorpe North & Western

[57] ABSTRACT

A measuring tool for measuring and marking a generally straight distance between opposing boundaries comprises an elongate shaft which is selectively extendable to span a range of distances. A measuring scale is formed in the shaft for indicating the length spanned by the shaft, and a cockable/releasable pointed tip is disposed on an extremity of the tool for making indentation markings on a surface to be marked. A screw and corresponding measuring scale for specifying a depth of penetration of the baluster into a handrail or stair tread for inclusion in the length indicated are also available in a preferred embodiment.

10 Claims, 2 Drawing Sheets

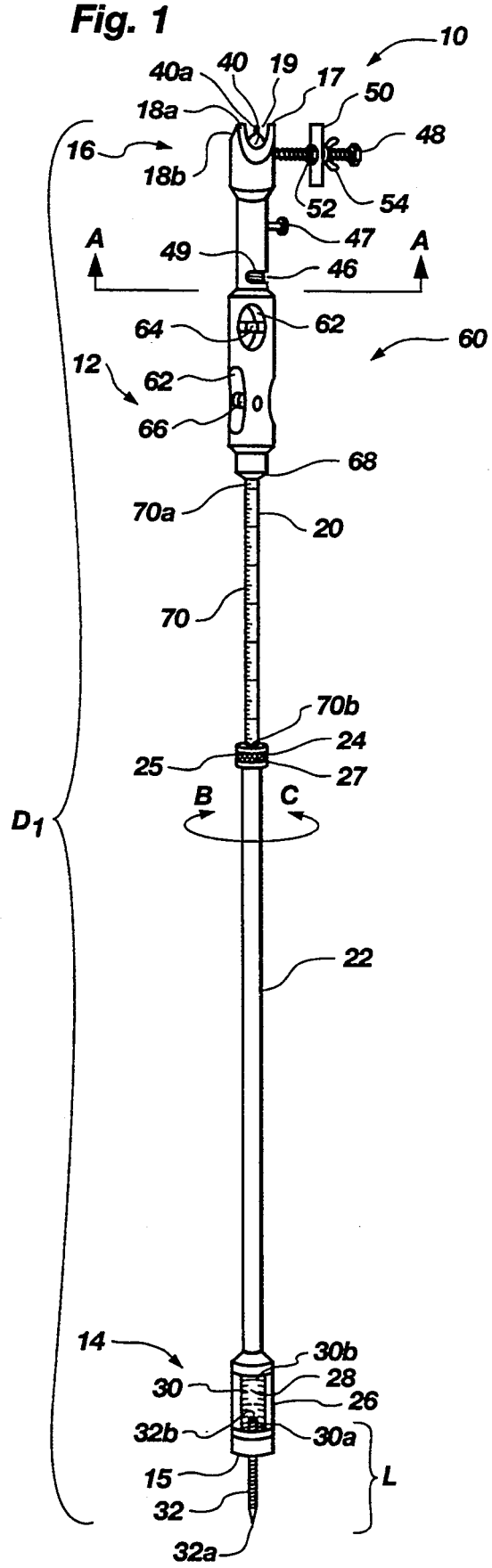
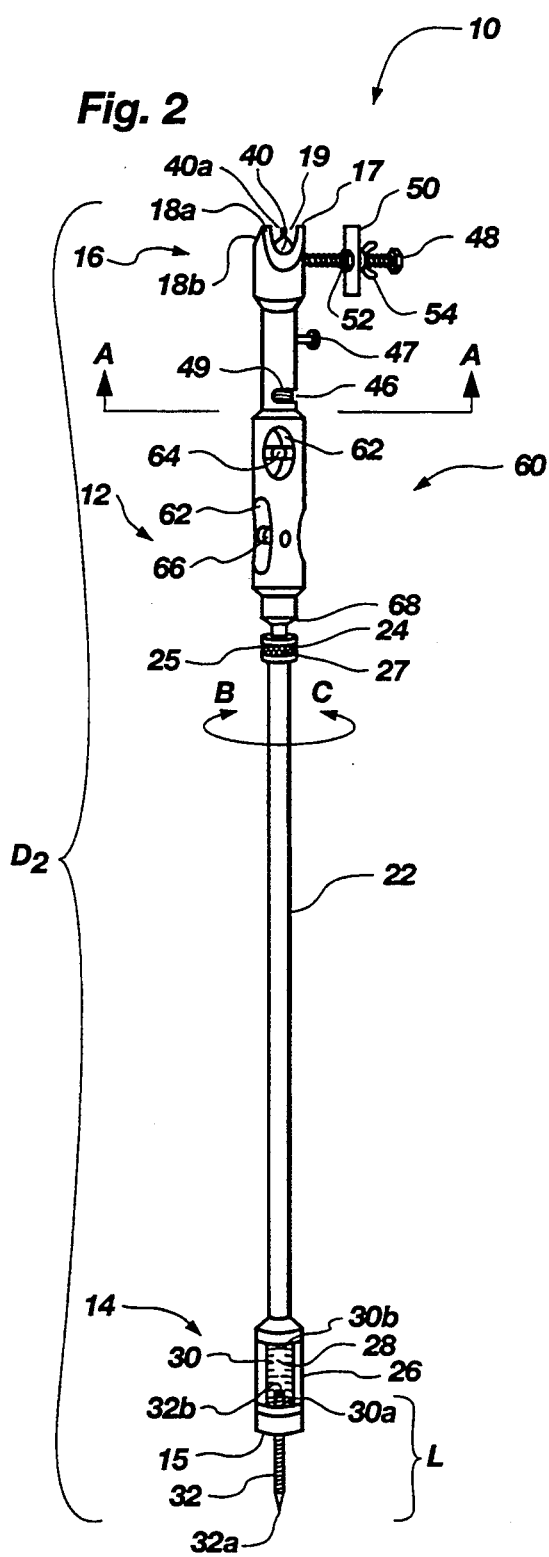

APPARATUS AND METHOD FOR MEASURING BALUSTER LENGTHS AND REPLICATING BALUSTER LAYOUT FROM A BASE SURFACE TO A HANDRAIL

BACKGROUND OF THE INVENTION

1. The Field of the Invention

The present invention concerns a hand held device and accompanying method for measuring baluster lengths and replicating a baluster layout from a base surface to a handrail, or vice-versa.

2. The Background Art

Balusters can be installed between stair treads and handrails in a number of different ways, and usually extend vertically from the stair tread to the handrail. It is therefore often desired to make precisely vertical preliminary measurements and markings prior to installing balusters. It is usually the case that the stairway is constructed first, after which a handrail is installed. A baluster layout pattern is marked on the stair tread to indicate where the base of each baluster is to be secured. The handrail may be preliminarily supported at or near the top and the bottom of the stairway, or in some other preliminary arrangement, prior to the installation of the balusters. It is then necessary to (1) replicate the baluster layout onto the bottom of the handrail, i.e. by making a series of reference markings on the bottom of the handrail which correspond vertically to each baluster layout marking, and (2) measure the vertical distances therebetween. The vertical measurement is used to either determine or verify the required baluster lengths. The reference marking indicates the point on the handrail where the top of the baluster should be attached. It is particularly important that the reference markings be placed substantially vertical relative to the stair tread layout for accurate measurements and subsequent placement of the balusters.

A plurality of balusters is generally used to support a handrail. It is therefore desirable to quickly and accurately replicate the baluster layout from the stair tread onto the bottom of the handrail and make the corresponding vertical measurements. The precision with which the markings are replicated affects the accuracy of the corresponding vertical measurements, whether the balusters will be placed substantially vertical, and whether the balusters will be consistently placed with respect to each other. Imprecise markings thus result in future correction and delay, or misaligned balusters.

In addition to the importance of accurate vertical measurements, alignment and placement of the balusters, the type of reference marking made has significance. The tops of balusters are often formed in the shape of a cylinder for insertion within the bottom of the handrail to secure a firm connection. Holes are drilled in the bottom of the handrail for receiving the top portions of the balusters. It is therefore desirable that the reference markings on the handrail comprise indentations instead of mere pencil or other surface marks in order to entrain the drill bit during drilling and thereby inhibit initial slippage of the drill bit.

It is also desirable that the vertical measurements reflect the depth of penetration of the baluster into the handrail in order to avoid error and confusion in cutting balusters to the proper length. For example, if an installer desired to insert a baluster one half inch into the handrail, if the vertical distance to be spanned by the baluster between the stair tread and handrail was measured at thirty-one and one-half inches, the installer would need to remember to add a half inch to the measurement and cut a thirty-two inch baluster. A measuring apparatus capable of taking the depth of penetration into account would eliminate any confusion or error relating thereto.

It is further important to limit the number of tools used to make the measurements and reference markings, which are often made with two or more apparatus such as a tape, level or other measuring/positioning device, and a pencil or other marking device. The use of two or more apparatus requires additional time and introduces additional opportunity for error.

There is thus a need to achieve a single apparatus and method for assisting in the placement of balusters which quickly and accurately measures vertical distances bounded by a stair tread and a handrail, taking into account the depth of penetration into the handrail, when desired. There is further a need for such an apparatus which is also capable of replicating layout markings in the form of indentations onto the bottom of the handrail substantially vertically with respect to said layout markings. Those having ordinary skill in the art will appreciate that these and other needs are met by the present invention.

OBJECTS AND SUMMARY OF THE INVENTION

It is an object of the present invention to provide a measuring tool for quickly and accurately measuring a generally vertical distance bounded by a point on a stair tread and a point on a handrail.

It is an additional object of the invention to provide such a measuring tool for quickly and accurately replicating a baluster layout pattern from a stair tread onto a handrail.

It is another object of the invention to provide such a measuring tool which provides a consistent degree of accuracy from one use to the next.

It is also an object of the invention to provide such a measuring tool which is simple in design, construction and operation.

It is a further object of the invention in accordance with one aspect thereof, to provide such a measuring tool capable of making such vertical measurements which reflect a depth of penetration of a baluster into the handrail.

It is still another object of the invention, in accordance with one aspect thereof, to provide such a measuring tool for making indentations in the bottom of a handrail.

The above objects and others not specifically recited are realized in a specific illustrative embodiment of a measuring tool for measuring baluster lengths and aligning balusters. The measuring tool includes an elongate shaft which is selectively extendable to span a range of distances. A measuring scale is formed on the shaft for indicating the length spanned by the shaft, and a cockable/releasable pointed tip is disposed on an extremity of the tool for making indentation markings on a surface to be marked. A screw and corresponding measuring scale for specifying a depth of penetration of the baluster into a handrail or stair tread for inclusion in the length indicated are also available in a preferred embodiment.

BRIEF DESCRIPTION OF THE DRAWINGS

The above and other objects, features and advantages of the invention will become apparent from a consideration of the subsequent detailed description presented in connection with the accompanying drawings in which:

FIG. 1 is a perspective view of a baluster measuring tool made in accordance with the principles of the present invention, in a partially extended position;

FIG. 2 is a perspective view of the baluster measuring tool of FIG. 1 in a fully retracted position;

DETAILED DESCRIPTION

Figure 3:
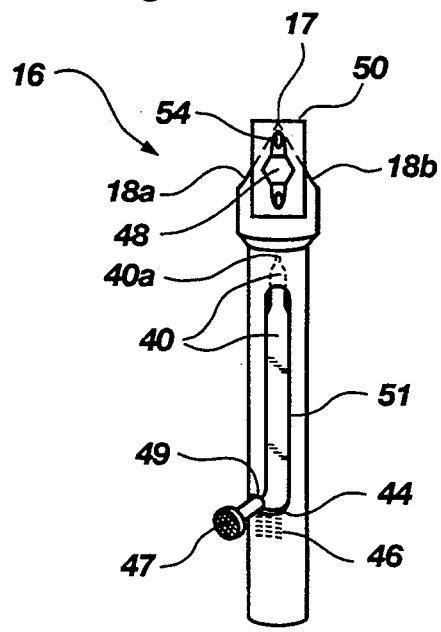
FIG. 3 is a side view of an upper portion of the baluster measuring tool of FIGS. 1-2 with the plunger in a cocked position.

Reference will now be made to the drawings wherein like structures will be provided with like reference numerals.

A preferred embodiment in accordance with the present invention is illustrated in FIGS. 1-2. Referring now to FIGS. 1-2, there is shown a baluster measuring tool, generally designated at 10. The measuring tool 10 includes an elongate shaft, generally designated at 12, which includes a first free end, generally designated at 14, and a second free end, generally designated at 16. The measuring tool 10 further includes a cylindrical member 20 slidably circumscribed within a tubular member 22, and a locking sleeve 24 circumscribing said tubular member 22 at an open end 25 thereof. The locking sleeve 24 comprises a knurled outer surface 27. A measuring scale comprising consecutively numbered gradations 70, beginning with gradation 70a, is disposed about an outer surface of the cylindrical member 20.

The first end 14 of the shaft 12 includes a base 15 and a penetration depth specification chamber 26 having a semicylindrical inner surface 28 on which consecutively numbered gradations 30 are disposed. Said gradations 30 begin with gradation 30a and end with gradation 30b. A screw 32 of a predetermined length (bracket L) has a measuring end 32b and an opposing tip 32a, and is screwably disposed into the base 15. The measuring end 32b extends axially into the penetration depth specification chamber 26, and the tip extends axially outward from the base 15.

The second end 16 of the shaft 12 includes a distal edge 17 and opposing beveled portions 18a and 18b. The second end 16 further includes an aperture 19 wherein a spring loaded plunger 40 is disposed. A screw 48 extends radially outward from the second end 16, onto which a positioning plate 50, a hex nut 52 and a wing nut 54 are screwed. The plunger 40 includes a tip 40a, a base 44 and a handle 47, which is slidably journalled within plunger channel 51 (see FIGS. 3-4). The plunger 40 is mounted upon a mounting spring 46 secured to said base 44.

Located just below the second end 16 is a leveling station, generally designated at 60. The leveling station 60 includes display chambers 62 in which first and second bubble levels 64 and 66, respectively, are disposed. The bubble levels 64 and 66 are preferably, but not necessarily, positioned orthogonal with respect to each other. In addition, first bubble level 64 is preferably positioned parallel with respect to the planes of beveled portions 18a and 18b of the second end 16 of the shaft 12. The leveling station 60 further includes a base 68.

Figure 5:
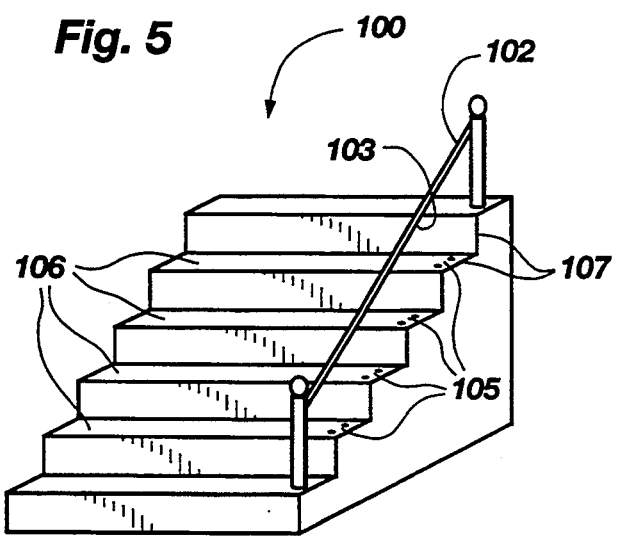
FIG. 5 is a perspective view of a preferred environment of use for the present invention.

A preferred environment for using the invention is as follows. Referring to FIG. 5, the preferred environment is directed to a stairway 100 having a stair tread 106 and an opposing handrail 102 having a degree of inclination with respect to the horizontal dimension. Balusters (not shown) are to be installed between the handrail 102 and the stair tread 106. The handrail 102 has a bottom surface 103, and the balusters are to be substantially vertically interposed between said bottom 103 and the stair tread 106. A baluster layout pattern 105 is preferably placed near a free edge 107 of the stair tread 106 before the measuring tool 10 is used. The layout pattern 105 will generally comprise a single mark for each baluster to be placed. The marks may be pencil or other marks, or even drilled or preformed holes wherein a base of a baluster is to be placed. This is the preferred environment for which the measuring tool 10 is intended.

A preferred method of use is as follows. Referring to FIGS. 1-2 and 5, a user grasps the measuring tool 10 and positions the tip 32a of the screw 32 against or within a layout mark 105. The cylindrical member 20 is released by twisting the locking sleeve 24 in a direction C. Said cylindrical member 20 is extended substantially vertically upward until the distal edge 17 of the second end 16 contacts the bottom 103 of handrail 102. The shaft 12 is thus selectively extendable to span a range of distances in this manner. The second end 16 is preferably rotated as needed so that the distal edge 17 runs generally orthogonal to the plane of the handrail 102, and the cylindrical and tubular members 20 and 22 are locked relative to one another by twisting the locking sleeve in a direction B. The measuring tool 10 is now interposed between the handrail bottom 103 and the stair tread 106. It is noted that the beveled portions 18a and 18b enable the distal edge 17 to abut the bottom of any handrail having a degree of inclination less than that of said beveled portions. As best shown in FIG. 3, the bevel of beveled portions 18a and 18b is steep enough to accommodate almost any handrail steepness and enable the distal edge 17 to abut the handrail bottom when the tool 10 is substantially vertically aligned. The first end 16 may alternatively comprise only a single beveled side, and a bevel of any degree of inclination is within the scope of the present invention.

At this point the user may choose to vertically align the tool 10 within the vertical plane of the handrail 102 by gently nudging said tool about and observing the display of the bubble level 66 responsive thereto until said bubble level 66 indicates that the tool 10 is vertical. Vertically aligning the tool 10 laterally with respect to the handrail 102 is also important, and the bubble level 64 may be negotiated for a precise lateral alignment. In addition, the positioning plate 50 can be used for laterally positioning the tool 10 by screwing said plate 50 to a desired location on the screw 48. The user may position said plate 50 against a side of the handrail or other desirable reference point so as to laterally position the tool 10 from one use to the next. The positioning feature of plate 50 is also useful to enable a user to make a plurality of consistently aligned measurements from one use to the next. The wing nut 54 or its equivalent as known in the art can be used to releasably secure the positioning plate 50 at said desired location. The hex nut 52 is used to lock the screw 48 to the second end 16 of the shaft 12.

After the tool 10 is interposed between the handrail bottom 103 and the stair tread 106 and vertically/laterally aligned as desired, the locking sleeve 24 is twisted in direction B to thereby lock the cylindrical member 20 (i.e. prevent it from sliding within the tubular member 22). With the measuring tool 10 firmly in place, the user can determine/verify the required length of the baluster to be placed, and make a corresponding marking in the handrail bottom 103.

The user determines the required baluster length by consulting the numbered gradations 70 (see FIG. 1), the operation of which will now be discussed. As indicated earlier, the gradations 70 begin with gradation 70a. The point of reference for reading the gradations 70 is the top of sleeve 24. As such, when the measuring tool is in a contracted position as in FIG. 2, the first gradation 70a is located adjacent the top of sleeve 24; the distance shown (bracket $D_2$) spanned by the tool 10 is the number (not shown) at gradation 70a. For example, gradation 70a would be designated by the number "28" for a distance $D_2$ of twenty-eight inches. When the measuring tool 10 is in an extended position, the gradation located adjacent the top of sleeve 24 (70b in FIG. 1) indicates the new distance (bracket $D_1$) spanned by the tool 10. The number at gradation 70b is thus a higher number than the number at gradation 70a and all numbers therebetween. In this manner the measuring tool 10 provides an indication of the length that it spans.

Figure 6:
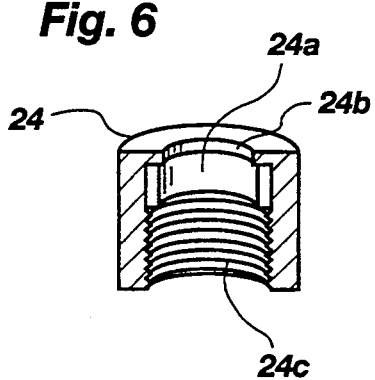
FIG. 6 is a side, cross-sectional view of a locking sleeve of the baluster measuring tool of FIGS. 1-2.

Referring to FIG. 6, the locking sleeve 24 includes the following structure. A pliable portion 24a, preferably made of plastic or some other polymeric compound, is retained at the inner surface of the sleeve 24 by a lip 24b. Female threads 24c correspond to male threads formed about the open end 25 of the tubular member 22. Referring now to FIGS. 1-2 and 6, when the locking sleeve 24 is rotated in the direction B, the pliable portion 24a is forced against the cylindrical member 20 by the open end 25 of the tubular member 22 to thereby secure said cylindrical member 20 within the tubular member 22 in a fixed position. Correspondingly, when the locking sleeve 24 is rotated in the opposite direction C the pliable portion 24a is released from against the cylindrical member 20 to thereby permit said cylindrical member to be longitudinally slidable within the tubular member 22 to enable variation of the length spanned by the shaft 12.

As mentioned above, the measurement of the vertical distance bounded by a mark 105 and the handrail bottom 103 is useful for many reasons. For example, if the balusters are to be cut after the handrail is placed as in FIG. 5, the vertical measurement indicates the required length of the balusters. The vertical measurement is also useful to verify that the handrail is correctly positioned and not sagging, that all balusters can have the same length, and so forth. If the design of the stairway or handrail is asymmetrical or otherwise irregular such that various baluster lengths are required, the tool 10 can be used to provide measurements of the various lengths required.

Figure 4:
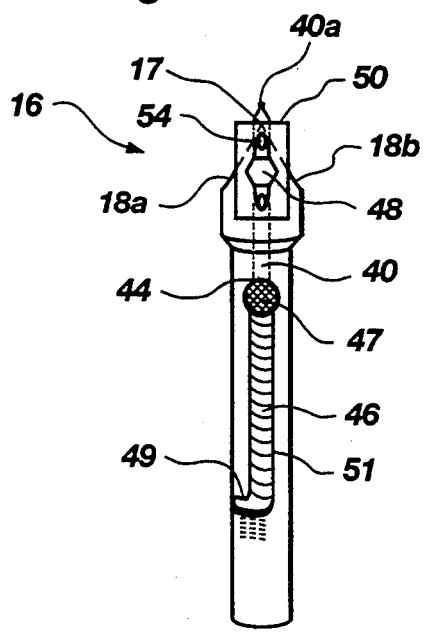
FIG. 4 is a view of the baluster measuring tool of FIG. 3 with the plunger in a released position.

The measuring tool 10 has other significant uses. For example, the layout pattern 104 can be replicated onto the handrail bottom 103 by using the spring loaded plunger 40, the operation of which will now be discussed. When the plunger 40 is at rest, the tip 40a thereof resides slightly below the distal edge 17 of the second end 16 as in FIG. 1 so as not to interfere with efforts to position and align the tool 10. Referring now particularly to FIGS. 3-4, in order to replicate the layout marking 105 onto the handrail bottom 103, the plunger 40 is cocked by grasping the handle 47 and forcing it downward against the mounting spring 46 and rotating it into a notch 49, as in FIG. 3. The plunger 40 is released by nudging the handle 47 out of the notch 49. This allows the mounting spring 46 to thrust the plunger 40 upward and project the plunger tip 40a to extend slightly beyond the distal edge 17 (see FIG. 4), to thereby make an indentation in the handrail bottom 103. The tip 32a of the screw 32 is substantially collinear with the tip 40a of the plunger 40 to thereby enable such an indentation to be substantially vertically aligned with its corresponding layout marking 105 if the tool 10 is substantially vertically aligned.

As mentioned above, making an indentation in the handrail bottom 103 at the locus where a baluster is to be connected is useful for many reasons. For example, many balusters are installed by inserting the top portion of the baluster into a hole formed in the handrail bottom 103. To this end, the baluster may have a cylindrical top, or a dowel, screw or some other structure projecting outward from the top. If the installation requires the drilling of holes into the handrail bottom 103, the drill bit can be placed on the indentation to keep it from sliding around upon actuation of the drill. This will in turn improve the precision and accuracy with which the holes are drilled. Further, the indentations are lasting and will remain, as opposed to pencil or other markings which may fade or become erased.

Another significant use of a preferred embodiment of the present invention is the capacity to enable specification of the depth of penetration of the baluster top into the handrail 102, or of the baluster bottom into the stair tread 106. This is accomplished by using the penetration depth specification chamber 26, the operation of which will now be discussed. The point of reference for specifying the penetration depth is the gradation 30a shown in FIG. 1, which is preferably marked with a "0." The screw 32 has a predetermined length L such that when the measuring end 32b thereof is positioned adjacent to the gradation 30a, the gradations 70 relative to the open end 25 of the tubular member 22 indicate the true length spanned by the tool 10 from tip 32b to distal edge 17. If it is desired to install balusters one half-inch into a handrail having an as yet undrilled bottom surface, a user may screw the screw 32 into the penetration depth specification chamber 26 so that the measuring end 32b is positioned adjacent the one-half inch gradation. Those skilled in the measuring arts will appreciate that the true length of any distance spanned by the tool 10 in this arrangement will always be one-half inch shorter than the length indicated by the gradations 70 relative to the top of the sleeve 24. In this manner, for example, if a baluster length of thirty-two inches were measured with the measuring end 32b adjacent the one-half inch gradation, this measurement would include the length to be spanned by the baluster (thirty one and one-half inches) and the penetration depth specified by the user prior to measuring (one-half inch). The installer would then know to cut a thirty-two inch baluster having one of its ends configured for placing one-half inch into the handrail or stair tread.

Those skilled in the art will appreciate that the scope of the present invention encompasses many combinations and a broad spectrum of features and structures equivalent to those specifically discussed herein. For example, the spring loaded plunger 40 may be replaced by a pointed prong which is slidably extendable to beyond the distal edge 17, instead of being spring loaded. The telescopic manner in which the tool 10 is extended and retracted may be replaced by some other structure, such as two screwably coupled members, two slidably coupled planer members, or an incrementally foldable/unfoldable staff. The screw 32 could similarly be replaced by a telescopic, slidable or incrementally foldable/unfoldable member. The cylindrical member 20 can be solid or tubular. The positioning plate 50 and accompanying screw 48 could be replaced with, for example, a C-clamp type device or its equivalent. The tubular member 22 may be solid or hollow.

In other words, the principles of the present invention encompass the broad concepts illustrated herein including extendable measuring sticks, leveling and aligning means, marking means, penetration depth specification means, measuring means, and the various combinations and subcombinations thereof. For example, an alternative embodiment of the invention includes a measuring tool having a spring loaded plunger or its equivalent without a penetration depth specification chamber. An additional embodiment includes a measuring tool having a depth penetration specification chamber or its equivalent without a spring loaded plunger. Further, the shaft 12 could be nonextendable with an extendable plunger having measuring gradations thereon; or the shaft could remain extendable without any measuring gradations thereon for use solely as a layout replication device.

Those skilled in the art will also appreciate additional environments in which the invention can be used. For example, the layout pattern may instead be placed on the bottom of the handrail. In this case, the measuring tool 10 could be used in much the same manner as described above, except that the user could begin by placing the second end 16 against a marking on the handrail bottom and then extend the tool downward by releasing the locking sleeve 24 until the screw tip 32a contacts the stair tread. The additional steps of vertically and laterally aligning the tool, taking a measurement and specifying a penetration depth would be the same. The step of making a mark could be achieved by simply pressing the screw tip 32a into the stair tread. In the alternative, the measuring tool could be oriented upside down, i.e. by positioning the screw tip 32a against the marking on the handrail bottom and extending the distal edge 17 of the second end 16 against the stair tread as desired and using the plunger 40 to mark the stair tread.

It is to be understood that the tool 10 is usable to install balusters into structure other than a stair tread. For example, a handrail can be installed horizontally on a floor, balcony, and so forth, and the tool 10 could be used to make measurements between the floor and the handrail.

While the present invention is described in terms of a measuring tool to be used for measuring baluster lengths and replicating and vertically aligning layout patterns, it is to be understood that the present invention is not limited to the placement of balusters, nor is it limited to vertical positioning. For example, the embodiments discussed herein could be modified to achieve a measuring tool for measuring and horizontally aligning and replicating layout patterns. An embodiment for aligning the tool to a certain inclination with respect to a reference point is also within the scope of the present invention. The principles of the invention may thus be used in any setting requiring the advantages thereof. Those having ordinary skill in the field of this invention will appreciate the advantages of the invention, and its application to a wide variety of uses.

The present invention represents a significant advance in the field of measuring devices and layout transfer/replication. It is noted that many of the advantages of the present invention accrue due to the inclusion of measuring apparatus, marking apparatus, leveling/aligning apparatus and penetration depth specification apparatus into a single device. The problems associated with using two or more separate devices to perform the procedures discussed above are overcome to a significant degree by the present invention. Those skilled in the art will appreciate from the preceding disclosure that the objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A measuring tool for measuring and marking a generally straight distance between a marking on a first boundary and a locus to be marked on an opposing second boundary, said measuring tool comprising:
    an elongate shaft comprising first and second elongate members longitudinally slidable relative to each other for varying the length spanned by the shaft, said first member including a first free end for positioning against the marking on the first boundary and said second member including an opposing second free end for positioning against the locus on the opposing second boundary;
    means formed on the shaft for indicating the length spanned by the shaft; and
    manually operable means mounted on the second free end of the shaft for moving into contact with the locus to thereby make an indentation therein.
    wherein the measuring tool is configured for measuring lengths to be spanned by balusters wherein the first boundary is a stair tread and the opposing second boundary is the bottom of an elongate handrail;
    wherein the second free end of the shaft includes a distal extremity, the manually operable means for moving into contact with the locus comprising a spring loaded plunger slidably disposed within the second free end of the shaft for selectively sliding against a spring into a fixed position and releasing from said fixed position to thereby permit the spring to force the plunger outward from the second free end of the shaft such that a tip of the plunger retractably projects beyond the distal extremity of said second free end to thereby make an indentation in the locus;
    wherein the handrail has sides, said measuring tool further comprising means formed on the second free end of the shaft for placing against the handrail to thereby enable the plunger tip to make an indentation at a predetermined distance from a side of said handrail.

2. A measuring tool as in claim 1, the means for placing against the handrail comprising:

an elongate screw disposed on the second free end of the shaft and extending outward therefrom; and a positioning plate having a threaded opening therein for screwing said plate onto the screw to a desired location thereon.

3. A measuring tool as in claim 1 wherein the handrail is inclined relative to a horizontal dimension, and wherein the second free end of the shaft includes a beveled portion on at least one side thereof and a top, such that when the shaft is substantially vertically aligned, said beveled portion has a degree of inclination exceeding the degree of inclination of the handrail to thereby enable the top of the second free end to contact the bottom of the handrail.

4. A measuring tool as in claim 1 wherein the elongate members of the shaft comprise a cylindrical member slidably disposed within a tubular member having an open end for receiving said cylindrical member, the means for indicating the length spanned by the shaft further comprising:

numbered gradations corresponding to the length spanned by the shaft disposed longitudinally along an exterior side of the cylindrical member such that when said cylindrical member is extended out of the open end of the tubular member, said gradations are consecutively exposed to view to thereby indicate the length spanned by the shaft.

5. A measuring tool for measuring the length of a generally straight distance between a marking on a first boundary and a locus on an opposing second boundary, said distance to be spanned by a support structure for interposing between said marking and said locus, said measuring tool comprising:

an elongate shaft comprising first and second elongate members longitudinally slidable relative to each other for varying the length spanned by the shaft, said first member including a first free end for positioning against the marking on the first boundary and said second member including an opposing second free end for positioning against the locus on the opposing second boundary;

means formed on the shaft for indicating the length spanned by the shaft; and manually operable means extending from the first free end of the first elongate member for selectively moving into said first member to thereby decrease by a predetermined amount the length of said first member;

wherein the handrail has sides, said measuring tool further comprising means formed on the second free end of the shaft for placing against the handrail to thereby enable the second free end to be positioned at a predetermined distance from a side of said handrail.

6. A measuring tool as in claim 5, the means for placing against the handrail comprising:

an elongate, threaded screw disposed on the second free end of the shaft and extending outward therefrom; and a positioning plate having a threaded opening therein for screwing said plate onto the screw to a desired location thereon.

7. A measuring tool as in claim 5 wherein the handrail is inclined relative to a horizontal dimension, and wherein the second free end of the shaft includes a beveled portion on at least one side thereof and a top, such that when the shaft is substantially vertically aligned, said beveled portion has a degree of inclination exceeding the degree of inclination of the handrail to thereby enable the top of the second free end to contact the bottom of the handrail.

8. A measuring tool as in claim 5 wherein the elongate members of the shaft comprise a cylindrical member slidably disposed within a tubular member having an open end for receiving the cylindrical member, the means for indicating the length spanned by the shaft further comprising:

numbered gradations corresponding to the length spanned by the shaft disposed longitudinally along an exterior side of the cylindrical member such that when said cylindrical member slides out of the open end of the tubular member, said gradations are consecutively exposed to view to thereby indicate the length spanned by the shaft.

9. A measuring tool for measuring the length of a generally straight distance between a marking on a first boundary and a locus on an opposing second boundary, said distance to be spanned by a support structure for interposing between said marking and said locus, said measuring tool comprising:

an elongate shaft comprising first and second elongate members longitudinally slidable relative to each other for varying the length spanned by the shaft, said first member including a first free end for positioning against the marking on the first boundary and said second member including an opposing second free end for positioning against the locus on the opposing second boundary;

means formed on the shaft for indicating the length spanned by the shaft; and manually operable means extending from the first free end of the first elongate member for selectively moving into said first member to thereby decrease by a predetermined amount the length of said first member;

wherein the manually operable means for selectively moving into the first member comprises:

a screw having a predetermined length screwably disposed within and extending axially away from the first free end of the first elongate member for selectively screwing into or out of said first elongate member; and numbered gradations disposed on the first free end of the first member for indicating any distance the screw has been screwed into the shaft to thereby indicate any decrease in length of said first member.

10. A method for measuring and marking a generally straight distance between a marking on a first boundary and a locus to be marked on an opposing second boundary, wherein said distance is to be spanned by a support structure interposed between said marking and said locus to be marked, comprising the steps of:

a) selecting an elongate shaft having first and second opposing ends and manually operable means mounted on said second end for moving into contact with the locus, wherein the shaft comprises first and second elongate members longitudinally slidable relative to each other;

b) positioning the first end of the shaft against the marking on the first boundary;

c) selectively varying the length of the shaft to thereby position the second end of said shaft against the locus on the second boundary such that the shaft spans the distance bounded by the first and second boundaries, by longitudinally sliding the first and second members relative to each other to thereby vary the length of the shaft;

d) selectively decreasing the length of the first member to thereby specify a depth of penetration of the support structure into at least one of the boundaries equal to said decrease in length, such that said depth is included in any determination of the length spanned by the shaft;

e) determining the length spanned by the shaft; and f) moving the manually operable means into contact with the locus to thereby make an indentation therein.

* * * * *